US012636227B2

(12) United States Patent
Kim et al.

(10) Patent No.: US 12,636,227 B2
(45) Date of Patent: May 26, 2026

(54) HEAT CONDUCTIVE NEEDLE FOR ACUPUNCTURE

(71) Applicants: Joo Young Kim, Iksan-si (KR); Seung Ah Seo, Iksan-si (KR); Dong Hyun Kim, Iksan-si (KR)

(72) Inventors: Joo Young Kim, Iksan-si (KR); Seung Ah Seo, Iksan-si (KR); Dong Hyun Kim, Iksan-si (KR)

( * ) Notice: Subject to any disclaimer, the term of this patent is extended or adjusted under 35 U.S.C. 154(b) by 0 days.

(21) Appl. No.: 18/759,952

(22) Filed: Jun. 30, 2024

(65) Prior Publication Data

US 2025/0127683 A1 Apr. 24, 2025

(30) Foreign Application Priority Data

Oct. 23, 2023 (KR) ........................ 10-2023-0142277

(51) Int. Cl.
*A61H 39/08* (2006.01)
*A61H 39/06* (2006.01)

(52) U.S. Cl.
CPC ........... *A61H 39/086* (2013.01); *A61H 39/06* (2013.01); *A61H 2201/0153* (2013.01); *A61H 2201/0207* (2013.01)

(58) Field of Classification Search
CPC .............................. A61H 39/08; A61H 39/086
See application file for complete search history.

(56) References Cited

U.S. PATENT DOCUMENTS

2024/0299246 A1 * 9/2024 Pai ........................ A61H 39/086

FOREIGN PATENT DOCUMENTS

KR 10-0988310 10/2010
KR 10-2019-0110715 10/2019

OTHER PUBLICATIONS

English Specification of 10-0988310.
English Specification of 10-2019-0110715.

* cited by examiner

*Primary Examiner* — Todd J Scherbel
(74) *Attorney, Agent, or Firm* — ANTONIO HA & U.S. PATENT, LLC

(57) ABSTRACT

The present disclosure relates to a heat-conducting needle for acupuncture in which heat conduction occurs only in the needle body area involved in the treatment during oriental medicine treatment and includes a needle body formed of a metal material with relatively high conductivity to be inserted into human tissue, a needle grip fixed to a rear end of the needle body to form a grip for procedure, and a non-conductive holding cover detachably coupled to the needle grip to cover the needle grip or covering the needle grip together with a portion of the needle grip and made of a material having relatively low conductivity.

3 Claims, 5 Drawing Sheets

HEAT CONDUCTIVE NEEDLE FOR ACUPUNCTURE

TECHNICAL FIELD

The present disclosure relates to a heat conductive needle for acupuncture used in oriental medicine treatment, and to a heat conductive needle for acupuncture that conducts heat conduction only in the needle body area involved in the treatment to allow safe acupuncture.

DISCUSSION OF RELATED ART

In general, needle is one of the oriental medical devices, which is inserted into the skin to provide mechanical stimulation to the tissue or applied to the skin to provide contact stimulation, thereby promoting healing of diseases or improving health.

Specifically, acupuncture treatment means that the practitioner holds the needle grip with the tension or rotational force of the finger for the tool called needle and inserts it into a part of the body called an acupoint to stimulate that part, thereby achieving a certain goal of promoting blood circulation and energy communication.

Acupoints are located along what are called meridians, which are the channels through which energy and blood flow. When energy and blood flow normally, it is healthy, when there is an abnormality in the body, the energy and blood cannot flow normally. When a person develops a symptom, the pathological response to that symptom is a blockage or impaired flow in one or more of the body's meridians.

By locating these points and placing acupuncture needles there, communication can be re-established, resulting in less pain, less swelling, and improved symptoms.

Here, the types and functions of needles are as follows.

Shear needle (chamchim): The needle is 1 chi and 6 poon long with a large head and sharp tip, shallowly stabbed and inserted into the skin to remove heat from the skin's surface.

Round-pointed needle (wonchim): The needle is 1 chi and 6 poon long with an egg-shaped round tip that is rubbed to remove pathogenic energy between muscles.

Blunt needle (jechim): The length of the needle is 3 chi and 5 poon long, and although the tip of the needle is round like millet, it is slightly pointed, and it stimulates the meridians and circulates blood energy without causing injury to the human body.

Lance needle (bongchim): The needle is 1 chi and 6 poon long, sharp as a spear on three sides of the tip, and in the case of a disease that has three edges and is stubborn.

Sword-shaped needle (peechim): The needle is 4 chi and 2 and a half long, the tip of the needle is like a knife, and it is used to cut the furuncle and remove the pain.

Round-sharp needle (wollee chim): The needle is 1 chi and 6 poon long, the thickness is about that of a horse's tail hair, the tip is round and sharp, the middle of the needle is slightly thick, and it gets rid of painful paralysis.

Spoon needle (hochim): The needle is 1 chi and 6 poon long, the end of the needle is particularly thin and resembles the mouth of a mosquito, it is gently stabbed and inserted into the skin, then the insertion is maintained for a long time to nourish healthy energy, and it gets rid of painful paralysis.

Long needle (jangchim): The needle is 7 chi long, the tip of the needle is sharp like a spear, and the needle is thin, so it gets rid of chronic paresthesia from deep within.

Big needle (daechim): The needle is 4 chi long, and the tip is slightly blunt, like a stick, and is used to remove water accumulated in the joint.

As mentioned above, needles were used separately according to their purpose, but recently only spoon needles and long needles are mainly used, and needles with a thickness of 03 mm and a length of 15 or 30 mm are mainly used.

Here, referring to the structure of the conventional needle, metal pendulums are manufactured, for example, with a diameter of about 0.2 to 0.35 mm and a length of about 35 to 80 mm, a sharp point is formed by grinding at the front end of the needle, and a needle grip that the practitioner can hold is formed at the rear end of the needle body.

Meanwhile, heat generated within cells increases the temperature of the tissue, dilating blood vessels and increasing blood volume, and applying heat directly to the painful area or applying heat to the peripheral nerves has a pain relieving effect and a soothing effect on the skin. Further, the increase in tissue movement has the effect of improving elasticity by increasing the elongation of fibrous tissues such as the viscosity and elasticity of connective tissue.

Accordingly, recently, acupuncture has been used to apply heat directly to the painful area or to apply heat through alternating current.

Here, in conventional needles, both the needle body and the needle grip are made of a metal material with thermal conductivity, so during the procedure where heat is applied as described above, heat is also transferred to the practitioner, which has the problem of impeding a safe and stable procedure.

Accordingly, a technology was disclosed in which a grip made of synthetic resin is integrally inserted into the needle body, like the medical needle disclosed in Korea Registered Utility Model No. 20-0345184.

However, the above prior art has problems in which the synthetic resin grip is manufactured to be integrally fixed to the needle, so that a new needle needs to be made, due to the increased volume, it is cumbersome to disinfect or store needles, and if the grip is dirty or damaged, it cannot be replaced.

Accordingly, novel technology is required to address the issues of the prior art as described above.

SUMMARY

The purpose of the present disclosure is to address the issues of the prior art as described above and to provide a heat conductive needle for acupuncture that conduct heat conduction only in the needle body area involved in the treatment to allow safe acupuncture.

In particular, the purpose of the present disclosure is to provide a heat conductive needle for acupuncture that covers the needle grip forming a grip and a portion of the needle body with a non-conductive holding cover to suppress heat conduction in the grip of the practitioner.

In addition, the purpose of the present disclosure is to provide a heat conductive needle that detachably couples the non-conductive holding cover to the needle grip to be used to selectively couple only needle that requires a holding cover.

In addition, the purpose of the present disclosure is to provide a heat conductive needle for acupuncture that may more firmly couple the non-conductive holding cover to the needle body.

Technical tasks that may be obtained from the disclosed embodiments are not limited to the above-mentioned purposes, and other technical tasks not mentioned are clearly understood by those skilled in the art to which the embodiments disclosed below belong.

As a technical means to achieve the above-mentioned technical task, an embodiment of the present disclosure includes a needle body formed of a metal material with relatively high conductivity to be inserted into human tissue, a needle grip fixed to a rear end of the needle body to form a grip for procedure, and a non-conductive holding cover detachably coupled to the needle grip to cover the needle grip or covering the needle grip together with a portion of the needle grip and made of a material having relatively low conductivity.

Further, the non-conductive holding cover includes a needle grip cover made of any one of synthetic resin, silicone, rubber, and latex, made in a tubular shape, and detachably coupled along the longitudinal direction of the needle grip and a needle body cover made of the same material as the needle grip cover and made in a tubular shape, provided at a lower end of the needle grip cover, and detachably coupled along the longitudinal direction of the needle body.

Further, the needle grip cover is configured separately from the needle body cover, and the non-conductive holding cover further comprises an incision cut along the longitudinal direction of the needle grip cover to form an opening in a portion of the needle grip cover and coupled to the needle grip through the opening to couple the needle grip cover to the needle grip in a wound form.

Further, the non-conductive holding cover further includes fastening members provided in a male and female form at both ends of the incision to detachably fasten both ends of the incision, and the fastening members includes a fitting groove formed in a groove shape at one end of both ends of the incision and a fitting protrusion formed to protrude on the other end of the both ends of the incision to be fitted and coupled to the fitting groove.

Further, the fitting protrusion is formed with a cross-sectional area that is larger than a cross-sectional area of the fitting groove and formed with a curable coating layer made of a material having hardenability on the surface thereof so that the fitting protrusion is forcefully fitted into the fitting groove.

According to any one of means for addressing the above-mentioned issues, the present disclosure can provide the heat conduction needle for acupuncture that conduct heat conduction only in the needle body area involved in the treatment to allow safe acupuncture.

In particular, the present disclosure can provide a heat conductive needle for acupuncture that covers the needle grip constituting a grip with the needle grip cover constituting a non-conductive holding cover to suppress heat conduction in the grip of the practitioner.

Further, the present disclosure can provide a heat conductive needle for acupuncture that covers a portion of the needle body with a needle body cover constituting a non-conductive holding cover to expose only the tip of the needle body, thereby promoting the safety of the practitioner.

In addition, the present disclosure can provide a heat conductive needle for acupuncture that detachably couples the non-conductive holding cover to the needle grip, allowing the holding cover to be selectively coupled to only the needle that is needed.

Further, the present disclosure can provide a heat conductive needle for acupuncture that forms an incision in the needle holding cover to attach the needle grip cover to the needle grip in the form of a coil, and fastening the incision through fastening members, thereby firmly coupling the needle grip cover depending on the thickness of the needle grip.

Effects that may be obtained from the disclosed embodiments are not limited to the above-mentioned effects, and other effects not mentioned are clearly understood by those skilled in the art to which the embodiments disclosed below belong.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
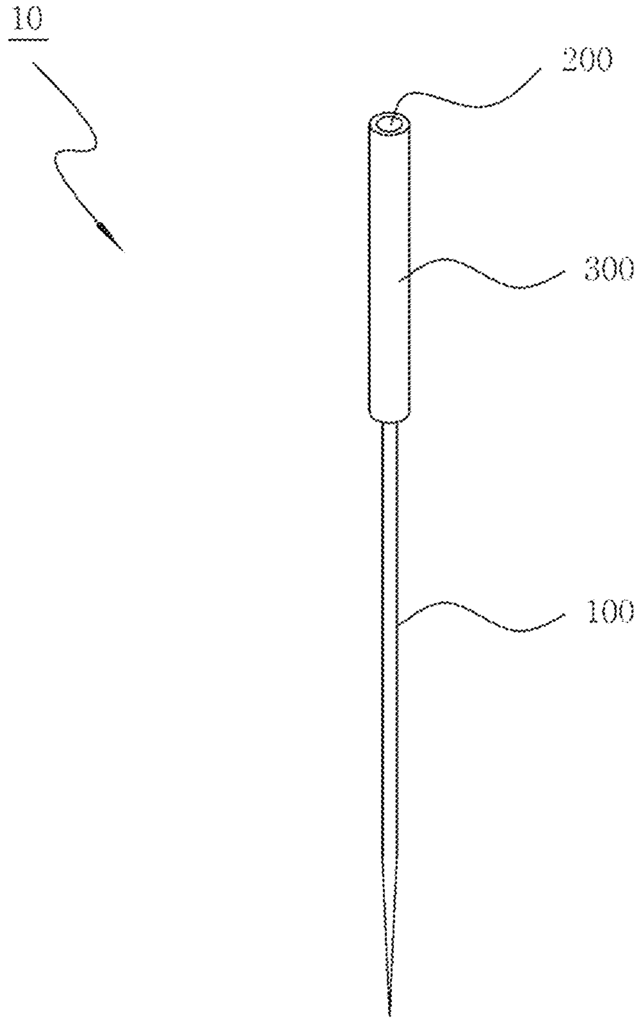
FIG. 1 is a perspective view showing a combined state of a heat conductive needle for acupuncture according to an embodiment.

Hereinafter, various embodiments will be described in detail with reference to the attached drawings. The embodiments described below may be modified and implemented in various different forms. In order to explain the characteristics of the embodiments more clearly, detailed descriptions of matters widely known to those skilled in the art to which the following embodiments belong have been omitted. Further, in the drawings, parts that are not related to the description of the embodiments are omitted, and similar parts are given similar reference numerals throughout the specification.

Throughout the specification, when a component is said to be "connected" to another component, this includes not only the case of being "directly connected" but also the case of being "connected with another component in between." Further, when it is said that a certain component "includes" a certain component throughout the specification, it means that it may further include other components, not excluding other components unless otherwise stated.

Hereinafter, embodiments will be described in detail with reference to the attached drawings.

Figure 2:
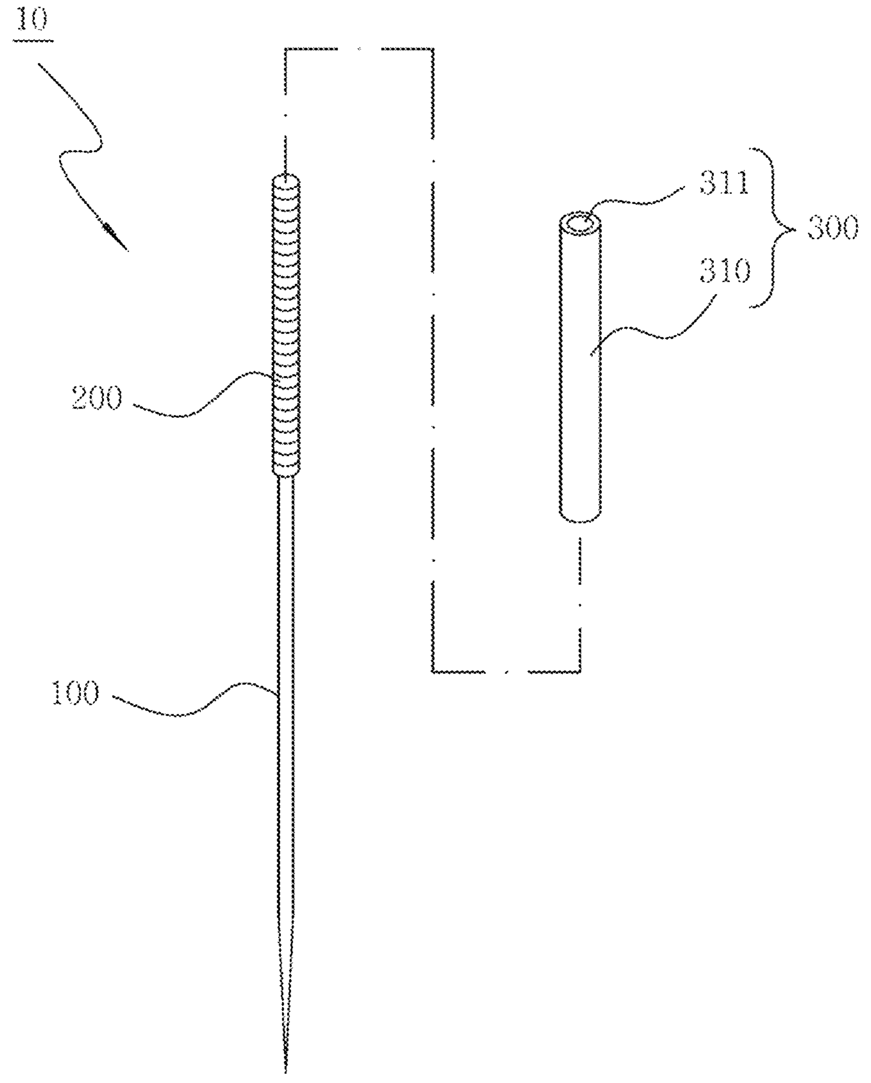
FIG. 2 is an exploded perspective view showing the disassembled state of a heat conductive needle for acupuncture according to an embodiment.
Figure 3:
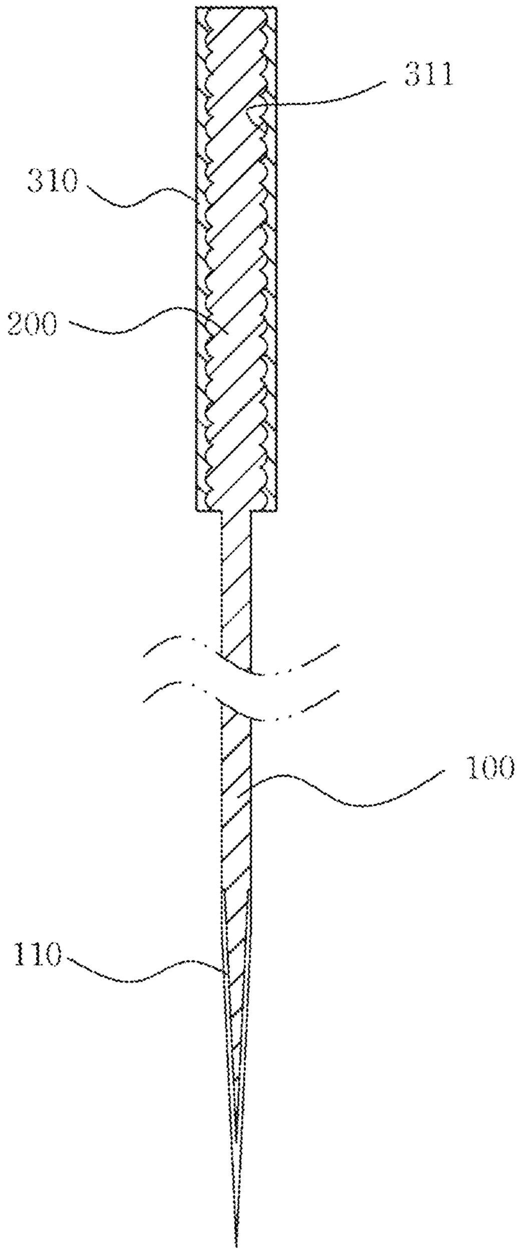
FIG. 3 is a longitudinal cross-sectional view showing a heat conductive needle for acupuncture according to an embodiment.
Figure 4:
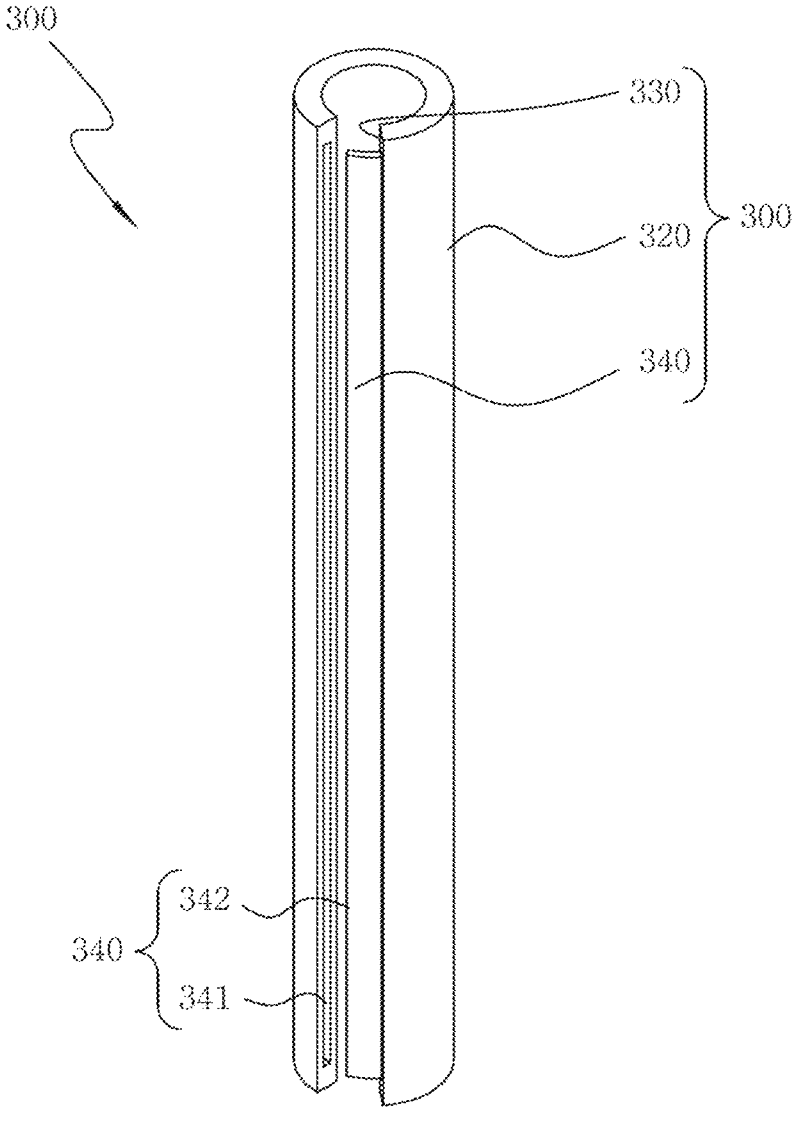
FIG. 4 is a perspective view showing a needle grip cover constituting a non-conductive holding cover for a heat conductive needle for acupuncture according to an embodiment.
Figure 5:
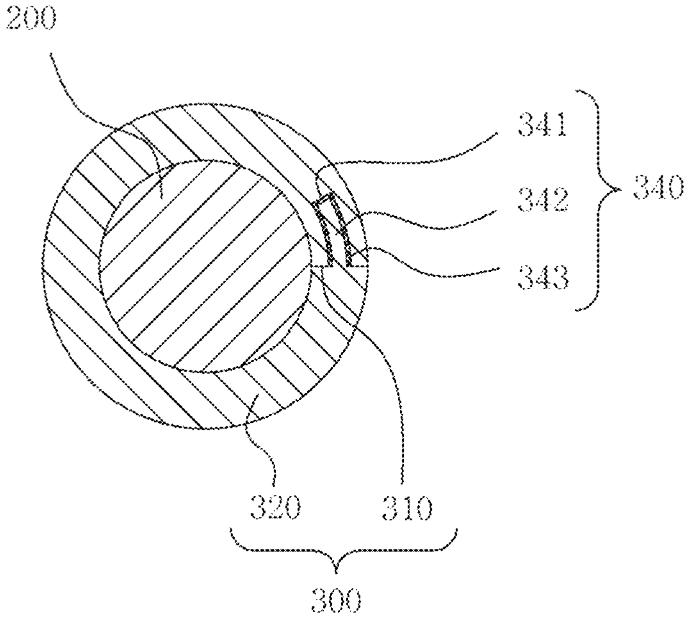
FIG. 5 is a cross-sectional view showing a needle grip cover constituting a non-conductive holding cover for a heat conductive needle for acupuncture according to an embodiment.

FIG. 1 is a perspective view showing a combined state of a heat conductive needle for acupuncture according to an embodiment, FIG. 2 is an exploded perspective view showing the disassembled state of a heat conductive needle for acupuncture according to an embodiment, and FIG. 3 is a longitudinal cross-sectional view showing a heat conductive needle for acupuncture according to an embodiment. FIG. 4 is a perspective view showing a needle grip cover constituting a non-conductive holding cover for a heat conductive needle for acupuncture according to an embodiment, and FIG. 5 is a cross-sectional view showing a needle grip cover constituting a non-conductive holding cover for a heat conductive needle for acupuncture according to an embodiment.

The heat conductive needle for acupuncture 10 according to an embodiment of the present disclosure is used in oriental medicine treatment and is a needle that conducts heat only in the needle body area involved in treatment, allowing the practitioner to perform safe and stable acupuncture.

Specifically, the heat conductive needle for acupuncture 10 according to an embodiment may include a needle body 100, a needle grip 200, and a non-conductive holding cover 300 as shown in FIGS. 1 and 2.

The needle 100 may be a part that is inserted into the human body tissue at the acupuncture point by the practitioner and may be made of a metal material with relatively high conductivity.

For example, the needle body 100 may be made of stainless steel, and any conductive metal material such as an alloy of nickel and copper may be used.

Further, the needle body 100 may be manufactured in various lengths and thicknesses depending on the intended use.

This needle body 100 may have a sharp tip, be inserted into human tissue by pressure from the practitioner, and be made of a conductive material, so that it can transfer heat supplied from an external device to human tissue, thereby increasing tissue temperature and relieving pain.

Meanwhile, as shown in FIG. 3, the needle body 100 may be coated with an additional conductive layer 110 made of a material with relatively high conductivity on the outer peripheral surface of the sharp tip.

That is, the additional conductive layer 110 may be made of a material with higher conductivity than the body 100 and be inserted into human tissue, so that heat or electromagnetic waves supplied to the needle body 100 can be smoothly transmitted to human tissue.

Here, the additional conductive layer 110 may be made of a material with relatively higher conductivity than iron, such as silver or copper.

The needle grip 200 may be a component that is fixed to the rear end of the needle 100 to form a grip for the procedure.

This needle grip 200 may be formed of various materials and shapes and may be formed at the rear end of the needle 100.

For example, the needle grip 200 may be made of the same metal material as the needle body 100 and may be formed in the form of a coil spring and fixed to the rear end of the needle body 100.

In other words, the needle grip 200 may be given the same conductivity as the needle body 100, so that it can be connected to an external device and directly receive heat from the external device and can also receive electromagnetic waves of a predetermined frequency.

Accordingly, the needle body 100 may transfer heat to human tissue through heat or electromagnetic waves supplied to the needle grip 200.

In addition, the needle grip 200 may supply not only warm heat but also cold heat as needed, thereby delivering cold heat to human tissue through the needle body 100.

For example, the needle grip 200 may have a thermoelectric module, in which a plurality of N-type semiconductors and a plurality of P-type semiconductors are connected in series through a conductor, connected to the distal end, thereby selectively receiving hot or cold heat through the thermoelectric module.

Meanwhile, the needle grip 200 may be made of a non-conductive material such as synthetic resin rather than a metal material.

In this case, an external device that supplies heat or electromagnetic waves may be connected to a portion of the needle body 100 to supply heat or electromagnetic waves.

The non-conductive holding cover 300 may be a component that covers the outer peripheral surface of the needle grip 200 described above to protect the practitioner's hands holding the needle grip 200 from heat.

That is, the non-conductive holding cover 300 may be formed of a non-conductive material with relatively low conductivity and is selectively and detachably coupled to the needle grip 200 to cover the outer peripheral surface of the needle grip 200 or a portion of the needle grip 100 and the needle grip 200 together.

Specifically, the non-conductive holding cover 300 may be made of one or more materials selected from synthetic resin, silicone, rubber, and latex, and as shown in FIGS. 1 and 2, it may be manufactured in the form of a tube and may be coupled along the longitudinal direction of the needle grip 200.

This non-conductive holding cover 300 may be configured to include a needle grip cover 310 and a needle body cover 320, as shown in FIGS. 2 and 3.

The needle grip cover 310 may designed to cover the outer peripheral surface of the needle grip 200, may be manufactured in a tubular shape and may be coupled along the longitudinal direction of the needle grip 200 to cover the outer peripheral surface of the needle grip 200.

Here, the needle grip cover 310 may have elasticity due to the nature of the material, and the inner diameter of the through hole forming the tube may be formed to be smaller than the outer diameter of the needle grip 200.

Accordingly, the inner diameter of the needle grip cover 310 may be expanded through elastic deformation during the process of being inserted into the needle grip 200, and after being inserted into the needle grip 200, it may be brought into close contact with the outer peripheral surface of the needle grip 200 through restoring force.

In addition, the needle grip cover 310 may be formed shorter than the length of the needle grip 200, as shown in FIG. 3, so that the tip of the needle grip 200 can be exposed.

Accordingly, the needle grip 200 may be connected to an external device that supplies hot or cold heat or electromagnetic waves to the exposed tip.

The needle body cover 320 may be a component that covers a portion of the needle grip cover 100 and be manufactured in the form of a tube made of the same material as the needle grip cover 310 and be provided at the bottom of the needle grip cover 310, so that it can cover the needle body 100 while being removably coupled along the longitudinal direction of the needle body 100.

As shown in FIG. 3, the needle body cover 320 may be manufactured as the same body as the needle grip cover 310, or alternatively, it can be constructed separately from the needle grip cover 310 and coupled to the needle grip cover 310.

Here, the needle body cover 320 may have elasticity due to the nature of the material, and the inner diameter of the through hole forming the tube may be formed to be smaller than the outer diameter of the needle body 100.

Accordingly, the inner diameter of the needle body cover 320 may be expanded through elastic deformation during the process of being inserted into the needle body 100, and after being inserted into the needle body 100, it may be brought into close contact with the outer peripheral surface of the needle body 100 through restoring force.

In addition, the needle body cover 310 may be formed shorter than the length of the needle body 100, as shown in FIG. 3, so that the sharp tip of the needle body 100 can be exposed.

Accordingly, the needle body 100 may be inserted into human tissue through the exposed tip and provide treatment.

Meanwhile, the needle grip cover 310 may have a plurality of catch grooves 311 formed along the longitudinal direction of the inner peripheral surface as shown in FIG. 3.

This catch groove 311 may be generated during the molding process of the needle grip cover 310 and is caught by the unevenness of the needle grip 200, which is in the form of a coil spring, thereby preventing arbitrary movement of the needle grip cover 310 along the longitudinal direction of the needle grip 200.

This catch groove 311 may be generated during the molding process of the needle grip cover 310.

Further, a plurality of non-slip protrusions or non-slip grooves (not shown) may be formed on the outer peripheral surface of the needle grip cover 310 to prevent the practitioner from slipping.

Meanwhile, the needle grip cover 310 may be configured separately from the needle body cover 320, as described above, and in this case, the non-conductive holding cover 300 may be configured to include an incision 330 as shown in FIG. 4.

The incision 330 may be cut along the longitudinal direction of the needle grip cover 310 to form an opening in a portion of the needle grip cover 310.

The incision 330 is coupled to the needle grip 200 through the opening to couple the needle grip cover 310 to the needle grip 200 in a wound form.

Here, the needle grip cover 310 has elasticity due to the material characteristics, in the process of coupling to the needle grip 200 through the incision 330, the needle grip cover 310 may be opened and coupled through elastic deformation, and after being coupled to the needle grip 200, it may be brought into close contact with the outer peripheral surface of the needle grip 200 through restoring force.

Meanwhile, the needle grip cover 310, which is configured separately from the needle body cover 320, may be formed with a plurality of the above-described catch grooves 311 along the longitudinal direction of the inner peripheral surface.

Meanwhile, the non-conductive holding cover 300 may be configured to further include fastening member 340, as shown in FIGS. 4 and 5.

The fastening member 340 is a component that is provided in a male and female form at both ends of the incision 330 to detachably fasten both ends of the incision 330.

This fastening members 340 may be configured to include a fitting groove 341 and a fitting protrusion 342.

The fitting groove 341 may be formed in a groove shape at one of both ends of the incision 330 to provide a fastening portion for the fitting protrusion 342, which will be described later.

The fitting protrusion 342 may be formed to protrude from the other end of both ends of the incision 330 and be inserted into and fastened to the fitting groove 341.

That is, while the needle grip cover 310 is coupled to the needle grip 200, the fitting protrusion 342 is fastened to the fitting groove 341, so that it can be fixed in a state wound around the needle grip 200.

Here, the fitting protrusion 342 may be formed with a cross-sectional area larger than that of the fitting groove 341.

Accordingly, in the process of fitting the fitting protrusion 342 into the fitting groove 341, the fitting groove 341 is elastically deformed and expanded, and the fitting protrusion 342 may be forcibly fitted and fastened to the fitting groove 341.

In addition, as shown in FIG. 5, the surface of the fitting protrusion 342 is coated with a curable material 343, so that it can be given relatively stronger rigidity than the material of the needle grip cover 310.

Accordingly, in the process of fitting the fitting protrusion 342 into the fitting groove 341, the fitting groove 341 is elastically deformed and expanded smoothly through the curable coating layer 343, and the fitting protrusion 342 may be forcibly fitted and fastened to the fitting groove 341.

Here, the curable coating layer 343 may be made of a thermosetting resin such as phenol resin, urea resin, melamine resin, polyester resin, or epoxy resin and may strengthen the rigidity of the fitting protrusion 342 in a hardened state.

During the procedure, the heat conductive needle for acupuncture 10 including the above components is applied to the acupuncture point of the human body after the practitioner combines the non-conductive holding cover 300 to only the necessary needle grip 200 and needle body 100.

Here, the heat conductive needle 10 can be treated after being heated to a predetermined temperature, and it can be connected to an external device that supplies hot heat, cold heat, or electromagnetic waves to transfer heat to human tissue.

At this time, the external device is connected to the needle grip 200 exposed at the top of the needle grip cover 310 forming a tube shape to supply hot or cold heat or electromagnetic waves.

When the practitioner holds the non-conductive holding cover 300 and performs the procedure, heat conduction is suppressed by the non-conductive holding cover 300, so the procedure can be performed safely and stably.

As discussed above, according to the heat conductive needle for acupuncture 10 according to an embodiment, the needle grip 200 forming the grip may be covered with a non-conductive holding cover 300 to suppress heat conduction in the practitioner's grip, and the non-conductive holding cover 300 may be detachably coupled to the needle grip 200 and the needle body 100, so that the holding cover 300 can be used by selectively combining only a portion of the needle that is needed.

It will be understood that the above-described embodiments are for illustrative purposes, and those skilled in the art to which the above-described embodiments belong will be able to understand that it can be easily modified into other specific forms without changing the technical spirit or essential features of the above-described embodiments. Therefore, it should be understood that the embodiments described above should be understood as illustrative in all respects and not limiting. For example, each component described as a single type may be implemented in a distributed manner, and similarly, components described as distributed may be implemented in a combined form.

The protective scope through this specification is indicated by the following claims rather than the detailed description above, and it should be construed to include all changes or modifications derived from the meaning and scope of the claims and equivalent concepts thereof.

What is claimed is:

1. A heat conductive needle for acupuncture, the needle comprising:

a needle body formed of a metal material with high conductivity to be inserted into human tissue;

a needle grip fixed to a rear end of the needle body to form a grip for procedure; and a non-conductive holding cover detachably coupled to the needle grip to cover the needle grip or covering the needle grip together with a portion of the needle grip and made of a material having low conductivity wherein the non-conductive holding cover comprises a needle grip cover made of any one of synthetic resin, silicone, rubber, and latex, made in a tubular shape, and detachably coupled along the longitudinal direction of the needle grip; and a needle body cover made of the same material as the needle grip cover and made in a tubular shape, provided at a lower end of the needle grip cover, and detachably coupled along the longitudinal direction of the needle body, wherein the needle grip cover is configured separately from the needle body cover, and wherein the non-conductive holding cover further comprises an incision cut along the longitudinal direction of the needle grip cover to form an opening in a portion of the needle grip cover and coupled to the needle grip through the opening to couple the needle grip cover to the needle grip in a wound form.

2. The heat conductive needle of claim 1, wherein the non-conductive holding cover further comprises fastening members provided in a male and female form at both ends of the incision to detachably fasten both ends of the incision, and wherein the fastening members comprises a fitting groove formed in a groove shape at one end of both ends of the incision; and a fitting protrusion formed to protrude on the other end of the both ends of the incision to be fitted and coupled to the fitting groove.

3. The heat conductive needle of claim 2, wherein the fitting protrusion is formed with a cross-sectional area that is larger than a cross-sectional area of the fitting groove and formed with a curable coating layer made of a material having hardenability on the surface thereof so that the fitting protrusion is forcefully fitted into the fitting groove.

* * * * *